(12) United States Patent
Steele et al.

(10) Patent No.: US 8,920,609 B2
(45) Date of Patent: Dec. 30, 2014

(54) METHOD OF INCREASING ANHYDROSUGARS, PYROLIGNEOUS FRACTIONS AND ESTERIFIED BIO-OIL

(76) Inventors: Philip H. Steele, Starkville, MS (US); Fei Yu, Starkville, MS (US); Qi Li, Starkville, MS (US); Brian Mitchell, Starkville, MS (US)

( * ) Notice: Subject to any disclaimer, the term of this patent is extended or adjusted under 35 U.S.C. 154(b) by 1013 days.

(21) Appl. No.: 12/896,797

(22) Filed: Oct. 1, 2010

(65) Prior Publication Data

US 2011/0245489 A1 Oct. 6, 2011

Related U.S. Application Data

(60) Provisional application No. 61/247,751, filed on Oct. 1, 2009.

(51) Int. Cl.
| | | |
|---|---|---|
| *B01D 3/14* | (2006.01) | |
| *C10K 1/04* | (2006.01) | |
| *C10L 1/02* | (2006.01) | |
| *C10C 5/00* | (2006.01) | |
| *B01J 21/12* | (2006.01) | |
| *B01J 23/755* | (2006.01) | |

(52) U.S. Cl.
CPC .. *C10L 1/02* (2013.01); *Y02E 50/14* (2013.01); *C10K 1/04* (2013.01); *Y02E 50/13* (2013.01); *C10G 2300/1011* (2013.01); *B01J 21/12* (2013.01); *C10C 5/00* (2013.01); *B01J 23/755* (2013.01); *Y02E 50/32* (2013.01)
USPC .............. 203/87; 201/12; 201/21; 201/23; 201/25; 202/174; 202/180; 202/185.1

(58) Field of Classification Search
USPC ............. 585/240, 242; 201/12, 21, 23, 25; 568/458; 127/37; 203/87; 202/174, 202/180, 185.1
See application file for complete search history.

(56) References Cited

U.S. PATENT DOCUMENTS

| | | | |
|---|---|---|---|
| 5,395,455 A * | 3/1995 | Scott et al. ............ | 127/37 |
| 5,432,276 A * | 7/1995 | Moens .................. | 536/128 |
| 7,094,932 B2 * | 8/2006 | Majerski et al. ....... | 568/458 |
| 7,932,065 B2 * | 4/2011 | Medoff .................. | 435/165 |
| 8,323,456 B2 * | 12/2012 | Lin et al. .............. | 203/14 |
| 8,476,480 B1 * | 7/2013 | Brown et al. .......... | 585/240 |
| 8,519,203 B2 * | 8/2013 | Marinangeli et al. ..... | 585/240 |

\* cited by examiner

*Primary Examiner* — Nina Bhat
(74) *Attorney, Agent, or Firm* — Butler Snow LLP (57) ABSTRACT

The device and method are provided to increase anhydrosugars yield during pyrolysis of biomass. This increase is achieved by injection of a liquid or gas into the vapor stream of any pyrolysis reactor prior to the reactor condensers. A second feature of our technology is the utilization of sonication, microwave excitation, or shear mixing of the biomass to increase the acid catalyst rate for demineralization or removal of hemicellulose prior to pyrolysis. The increased reactivity of these treatments reduces reaction time as well as the required amount of catalyst to less than half of that otherwise required. A fractional condensation system employed by our pyrolysis reactor is another feature of our technology. This system condenses bio-oil pyrolysis vapors to various desired fractions by differential temperature manipulation of individual condensers comprising a condenser chain.

31 Claims, 3 Drawing Sheets

METHOD OF INCREASING ANHYDROSUGARS, PYROLIGNEOUS FRACTIONS AND ESTERIFIED BIO-OIL

CROSS REFERENCE TO RELATED APPLICATIONS

This application claims priority to provisional application 61/247,751, which was filed on Oct. 1, 2009 and is hereby incorporated by reference in its entirety.

STATEMENT REGARDING FEDERALLY SPONSORED RESEARCH OR DEVELOPMENT

This invention was made with Government support under DE-FG36-06GO86025 awarded by the U.S. Department of Energy. The Government has certain rights in the invention.

FIELD OF THE INVENTION

The present invention is generally directed toward a device and method increasing anhydrosugars yield during pyrolysis of biomass.

BACKGROUND OF THE INVENTION

Bio-oil Levoglucosan Production

Levoglucosan (1,6-anhydro-β-D-glucopyranose) is a product of cellulose combustion. When cellulose is heated to over 300° C., it undergoes various pyrolytic processes to produce as a major component in the resultant bio-oil an anhydrosugar known as levoglucosan. Levoglucosenone, in addition to levoglucosan, and other various anhydrosugars are produced in lesser but in additively significant quantities. Whole pyrolysis oil contains approximately 3% of levoglucosan when untreated wood biomass is pyrolyzed. Researchers have extensively investigated the mechanisms underlying levoglucosan formation during pyrolysis but a full understanding of the formation, intermediate reactions and degradation remain unknown. There are, however, empirical studies that have been performed demonstrating methods to increase anhydrosugars yield in bio-oil.

Shafizadeh (1980) analyzed the production of levoglucosan from various cellulose types and cottonwood wood fiber. His results were given as percentage yields of each tested feedstock. At 400-450° C. the range of yields of levoglucosan plus anhydrosugars from four pure commercial wood-based cellulose types was 42 to 56%. Yields of levoglucosan from wood, as opposed to pure cellulose, are known to be lower and Shafizadeh's results confirmed this with yields of levoglucosan plus anhydrosugar of 3% for untreated cottonwood fiber and 9% for $H_2SO_4$ acid-treated cottonwood fiber.

Complete removal of hemi-cellulose to produce a pure lignocellulose was performed by Shafizadeh (1980) and resulted in 37% yield of levoglucosan plus anhydrosugars. This researcher also pyrolyzed untreated pure holocellulose (lignin removed) to obtain only a 1% yield of levoglucosan and anhydrosugars. When the holocellulose was treated with 1% NaOH and 1% $H_2SO_4$ the yield of levoglucosan plus other anhydrosugars increased to 32%. The removal of hemi-cellulose resulted in a large increase in levoglucosan and other anhydrosugars yield. These results indicate that presence of hemicellulose rather than lignin in wood interacts to inhibit levoglucosan and anhydrosugars yields during pyrolysis.

Piskorz et al. (1989) studied fluidized bed fast pyrolysis of poplar wood and a number of types of cellulose produced by different processes. Both untreated and treated cellulose and poplar wood specimens were pyrolyzed at 500° C. with vapor residence time of 0.46 s. Biomass treatment was mild acid treatment at 5% of $H_2SO_4$ at 90° C. for 5.5 hours. Levoglucosan and anhydrosugars were quantified in the resultant bio-oil with a yield of 43.5% of these compounds for untreated cellulose and a somewhat higher 53.1% yield for cellulose with mild acid treatment. In addition, untreated poplar wood, which would contain all of its initial hemicelluloses, produced total levoglucosan plus anhydrosugars yield of only 8.95% while mild acid treated poplar wood produced a total yield of these compounds of 40.61%.

Piskorz et al. (1989) also tested, on poplar wood, a milder application of sulfuric acid and two mild acid HCl treatments with one of the mild HCl treatments followed by an additional $H_2SO_4$ treatment. Anhydrosugar yields were measured only in terms of levoglucosan yields. The results of these treatments indicated that levoglucosan yields from HCl treatments were a relatively low 4.51 and 17.5, with the lowest yield for the mildest HCl treatment. The highest yields of levoglucosan were 27.7 and 30.1% for the $H_2SO_4$ treatment alone and the $H_2SO_4$ treatment following HCl treatment, respectively. The treatment described above for 5% $H_2SO_4$ at 90° C. for 5.5 hours provided a levoglucosan yield of 30.42% while the second $H_2SO_4$ treatment was at 5% concentration for 2 h heating time at 100° C.

Research has also shown that deionized water or deionized hot water treatment sufficiently demineralizes biomass to increase anhydrosugars content (Scott et al. 1995). Therefore, water, or hot water deionization is in the public domain and may be practiced to increase anhydrosugars yields in bio-oil in conjunction with the utilization of our device and method.

Increased levoglucosan yields from various applied pretreatment processes to switchgrass feedstocks were investigated by Brown et al. (2001) to determine influence on yields of levoglucosan and cellobiosan. These researchers computed yields based on percentage of the aqueous bio-oil fraction. Three pretreatment processes were evaluated: acid hydrolysis (5.0 wt % $H_2SO_4$ at 100° C. for 2 h), demineralization that consisted of washing in dilute nitric acid (0.25% nitric acid at 25° C.), and demineralization with addition of 0.1% $(NH_4)_2SO_4$ as catalyst. After pyrolysis at 430° C. to 450° C. the concentration of levoglucosan in the organic fraction of untreated switchgrass pyrolysolate was only 4.4% with cellobiosan yield undetectable. These values increased to 35.6% of levoglucosan and 3.27% cellobiosan yield for a total of 38.87% yield of levoglucosan plus anhydrosugars for $H_2SO_4$ hydrolyzed switchgrass, 16.1% for demineralized switchgrass, and 20.7% for demineralized switchgrass with ammonia sulfate catalyst added.

Brown et al. (2001) also compared the same treatments for corn stover. The concentration of levoglucosan plus cellobiosan in the organic fraction of raw corn stover pyrolysolate totaled only 2.8%, increasing to 28.1% for hydrolyzed corn stover, 22.2% for demineralized corn stover, and 23.5% for demineralized corn stover with ammonia sulfate catalyst added.

Scott et al. (1995) received a patent on a method for pretreating cellulose or wood biomass with mild acids at various concentrations. Following pretreatment, feedstocks were washed with deionized water and dried to 1 to 30% moisture content followed by fast pyrolysis. Anhydrosugars were fractionated from the bio-oil and crystallized by various means. Water fractionation to separate the anhydrosugars into the aqueous fraction was not one of these means, however. Yield of levoglucosan from 99% pure cellulose was 45.7%; from hybrid poplar wood the levoglucosan yield was estimated at 35 to 40%; western hemlock wood was pretreated by mild acid, drained and dried to give 18.7% levoglucosan yield.

Bennett, et al. (2009) examined the potential to produce levoglucosan from bio-oil without biomass demineralization or hydrolysis to remove hemicellulose. Rather, the ratio of water added to achieve fractionation varied to determine an optimum level. For the optimum water addition level of 40% the yield of levoglucosan was 7.8% of total raw bio-oil weight. These researchers did not utilize acid pretreatment or water spray into the pyrolysis vapor stream to increase the yields of anhydrosugars with the expected result that their yields are considerably lower than possible with our device and methods.

The results reviewed above show that hot water or mild acid pretreatment of cellulose or lignocellulosic biomass, washing the biomass with distilled water, drying to a moisture content suitable for pyrolysis and application of fast pyrolysis has produced elevated yields of anhydrosugars in bio-oil compared to yields of untreated biomass. Yields vary but for pure untreated cellulose levoglucosan yields are about 3% while the yields for mild-acid pretreated cellulose the yields frequently exceed 50%. For lignocellulosic biomass the levoglucosan yields for untreated feedstocks is also about 3% and for treated material the highest reported yield is 36.3% for switchgrass feedstock. Spraying liquid or injecting a cooling gas into the pyrolytic vapor stream to reduce decomposition of the pyrolytic anhydrosugars during condensation was not mentioned by any previous practitioners.

Ultrasonic Lignocellulosic Biomass Pretreatment

Application of ultrasound technology to achieve biomass cellular disintegration to increase material surface area has been recently described in a thorough review of the technology application to the food industry (Vilkhu et al. 2008). The cellular disintegration resulting in size reduction combined with intra-particle diffusion are the mechanisms that were identified as allowing increased access by solvents, and/or catalysts, to the sonicated cellular material. This increased access appears to be responsible for the increased rates of chemical product extractions observed by practitioners. Researchers have employed ultrasound to lignocellulosic biomass feedstocks to improve the extractability of hemicellose (Ebringerova et al. 2002), cellulose (Pappas et al. 2002), and lignin (Sun et al. 2002; Fengel et al. 1984) or to produce cellulosic fiber from used paper (Scott et al. 1995; Sell et al. 1995).

Toma et al. (2006) employed ultrasound to improve the enzymatic hydrolysis of lignocellulosic materials in a two-stage process. First-stage sonication was applied to increase biomass surface area through cellular disintegration to smaller particles with increased surface area. Second-stage ultrasound was then applied to the pretreated biomass to increase hydrolysis rate during enzymatic treatment. Direct sonication at 20 kHz increased glucose yield by 93%.

A method comprising applying ultrasonic energy to a biomass to increase alcohol production rates and yields has been disclosed by Kinley and Krohn (2005). This invention employed the use of ultrasonic energy as a pretreatment step, either alone or in combination with any conventional pretreatment methods. The main objective of the Kinley and Krohn (2005) patent was to improve the efficiency of conventional ethanol production via various potential sonication treatments. Following conventional reduction of feedstock particle size by grinding the biomass water is added to produce slurry that is then sonicated in a pretreatment process to produce further particle size reduction and disaggregation of cellular structure. During this treatment a mild hydrolysis of a portion of the cellulose and hemicellulose components is claimed by the inventers. A second sonication is then applied to improve the typical acid-catalyzed hydrolysis performed on biomass during ethanol production. This treatment employs acid at a concentration necessary "to hydrolyze the hemicellulose fraction and decrystalize the cellulose into an amorphous state." Alternatively, the hydrolysis treatment may be achieved by enzyme catalysis also energized by sonication treatment (Kinley and Krohn 2005).

Kinley and Krohn (2005) performed only limited experiments to prove their process. Pretreatment of switchgrass slurry with only water added was sonicated for 0, 5 and 15 min followed by ethanol production from the slurry by simultaneous saccharification and fermentation or 7 days. Results showed that ethanol efficiency increased from 11.6 to 24.4% for 5 min sonication treatment but declined to 22.8% for the 15 min sonication treatment. In a second experiment the inventors found that 15 min of sonication of a pretreated biomass slurry rendered cellulose about 21-24% more digestible. In none of the references to sonication do practitioners mention that their technology was applied to biomass feedstocks to reduce the reaction time or to reduce the catalyst required by a reaction for demineralization.

Fast-Pyrolysis Quenching Technology

Fast pyrolysis technology produces a hot vapor stream that must be rapidly condensed by cooling. Some practitioners have applied quenching solids or liquids to achieve the required rapid cooling of the pyrolysis vapor. The earliest discussion of cooling pyrolysis vapor by quenching was by Sack (1978). By this method a solid carbonaceous material is utilized to rapidly cool pyrolysis vapors. The hot pyrolysis vapors act to preheat the carbonaceous materials prior to their pyrolysis. In addition to the preheating of the carbonaceous materials by the hot pyrolysis vapors a portion of the heavier hydrocarbons are condensed in the quench zone.

Freel et al. (1998) described a pyrolysis system for production of bio-oil by a circulating fluidized bed system. The pyrolysis vapors produced by this system are quenched for rapid cooling by cooled recycled bio-oil or by "other liquid solvent".

Conroy and Verma (1999) disclose a means for olefin fractionation via fast pyrolysis. Pyrolysis vapor from the decomposed feedstock is partially cooled by quenching with cooled bio-oil produced during the pyrolysis process. The quenching liquid can be liquid olefins or water. No practitioner has described injection of a cooling gas into the pyrolysis vapor stream to increase production of anhydrosugars in bio-oil.

Fractionating Condenser Technology

Scott et al. (1995) disclose a process for the production of anhydrosugars from pyrolytic bio-oil. These inventors do not mention partial or complete factional separation of aqueous, or pyroligneous fractions. Boateng et al. (2007) discuss the design of a condenser system for a fluidized bed pyrolysis system utilizing an impinger-type condenser with multiple canisters cooled by chilled water bath. Final pyrolysis vapor is collected with an electrostatic precipitator. No mention is made of employing differential temperatures to fractionally separate aqueous or pyroligneous fractions.

Agblevor (2009) discloses a catalytic fractionation system for condensation of pyrolysis vapor produced by a catalytic fluidized bed reactor by various cooling media including chilled water condensers, electrostatic precipitators, coalescence precipitators, coalescence filters and combinations thereof. The fractionated slate of products claimed by Agblevor (2009) are phenols, cresols, catechols, guaiacol, methyl-substituted phenols, indene and substituted naphthalene, syngas, char, and coke solids, c1-c4 hydrocarbons. No mention is made of concentrating a high proportion of an anhydrosugar-rich aqueous fraction. Water is not sprayed into the pyrolysis vapor stream to reduce anhydrosugar decomposition and neither levoglucosan nor other anhydrosugars are referenced as fractionated products. For the invention that we describe here we claim precedence over the Agblevor method as our conception and demonstrated application preceded his by several years.

Brown (2009) describes an auger reactor design utilizing multiple condensers to rapidly condense pyrolysis vapors. For the invention that we describe here we claim precedence over the Brown (2009) method as our conception and demonstrated application preceded his by several years. The Brown (2009) device's condenser train is comprised of three water condensers and an electrostatic precipitator which we shall reference as Condenser 4 to simply our discussion. Condensers 1 and 2 are followed by the electrostatic precipitator (Condenser 4) that acts as a condenser. Condenser 3 follows the electrostatic precipitator. The differential cooling of the condensers acts to condense various fractions of bio-oil depending on relative condenser temperature and molecular weight of the fraction. The four bio-oil fractions obtained from the respective Condensers 1 to 4 were analyzed for water content. The mean the described runs produced approximately (as estimated from graphical results) 17, 41, 18 and 66% water content values for Condensers 1, 2, 3 and 4, respectively. These results indicate that the multiple condensers employed for this device act to produce high water content fractions for two of the condensers, particularly for Condenser 4. However, high water content, without substantial bio-oil or levoglucosan yield is not an advantage in concentrating anhydrosugars yields during pyrolysis.

Brown (2009) provides levoglucosan yields for each of his bio-oil collection points. These results are for feedstocks that were not pretreated with acid and for which the vapor stream was not sprayed as described as one novelty of our patent. Therefore, the levoglucosan yields reported by Brown (2009) are low as would be expected for untreated biomass and for a reactor in which water is not sprayed into the pyrolysis vapor stream. Brown (2009) reports that levoglucosan yields were 2.246, 1.333, 2.244 and 0.000 for Condensers 1, 2, 3 and 4, respectively. These results show that the respective percentage yields of levoglucosan in Condensers 1, 2, 3 and 4 as a fraction of total levoglucosan produced were 58.9%, 19.1%, 21.9% and 0.0%. These percentage yields indicate that the collection of levoglucosan by the Brown (2009) condensers is relatively constant across all condensers with the exception of Condenser 4 which produced a value of zero levoglucosan. Brown (2009) discloses no method for increasing anhydrosugars in bio-oil nor does he demonstrate a method to concentrate a large percentage of bio-oil water content with its rich levoglucosan content in a single condenser.

Pyrolysis of High-Water Biomass

There is considerable effort being expended by researchers to develop means to pyrolyze high-moisture biomass in order to reduce the cost of drying to approximately 10% water content, or less. Little success has been reported to date by other researchers. However, we have tested pyrolysis of high moisture content biomass and have successfully pyrolyzed feedstocks with up to 50% water content. A major problem with this pyrolysis for most systems is the production of a large amount of water in the final bio-oil. However, our novel system of condensation of much of the pyrolysis water produced from pyrolysis of high-moisture feedstocks into a single condenser by our method will allows production of raw bio-oil with acceptable (<30%) water content under the condition that the bio-oil collected in the single condenser is treated. This treatment requires, as is described in this disclosure, allowing the self fractionation of the high water content bio-oil followed by removal of the anhydrosugar-rich aqueous fraction. The remaining pyroligneous fraction can then be combined with the bio-oils in the remaining condensers to produce a relatively low water content bio-oil. Researchers have previously avoided production of high water content bio-oil. This bio-oil will self fractionate at a water content between much above 40%. Disposal of this chemically-rich product has previously simply been an expense that has outweighed the cost of feedstock drying costs. However, our novel spraying and condenser fractionation device and methods are able to produce pyrolytic anhydrosugars in this water fraction that will more than justify the cost of water production during pyrolysis. Our method and device changes what is an unacceptable expense into a source of income. This water can be utilized as an anhydrosugar-rich substrate that can be hydrolyzed to simple sugars for biochemical fermentation or for reforming to hydrogen or hydrocarbons.

SUMMARY OF THE INVENTION

The device and method of this invention provides a means to increase anhydrosugars yield during pyrolysis of biomass. This increase is achieved by injection of a liquid or gas into the vapor stream of any pyrolysis reactor prior to the reactor condensers. A second novel feature of our technology is the utilization of sonication, microwave excitation or shear mixing of the biomass to increase the acid catalyst rate for demineralization or removal of hemicellulose prior to pyrolysis. The increased reactivity of these treatments reduces reaction time as well as the required amount of catalyst to less than half of that otherwise required. One embodiment of condenser temperature manipulation renders it possible to condense most of the water contained in a pyrolysis vapor stream into a limited number of condensers or into a single condenser. The high amount of water contained in this condenser causes self fractionation which forces separation of the aqueous and pyroligneous fractions of bio-oil. The aqueous fraction contains a high percentage of anhydrosugars that may be utilized to produce fuels or chemicals. The pyroligneous fraction, which contains fewer secondary and tertiary components of anhydrosugar decomposition as a result of our novel method to retard their decomposition can be catalyzed more effectively to produce hydrocarbon fuels or other products.

BRIEF DESCRIPTION OF THE DRAWINGS

The following drawings illustrate the preferred device and methods to obtain the bio-oil upgrading object of our invention. It is understood that there are many obvious methods and similar devices able to achieve this goal in by various means. Therefore, these drawings are provided as examples of one means to achieve the objective of our goal without limiting our invention in any way.

DETAILED DESCRIPTION OF THE INVENTION

One novel feature of our invention is a fractionating condenser that may be utilized to fractionate bio-oil pyrolysis vapors in a multitude of ways by means of manipulation of the temperature of any number of condensers comprising a condenser train. In this disclosure we describe one possible method and device for maximization of anhydrosugar yields from pyrolytic bio-oil produced by any fast, or slow, pyrolysis method. However, the focus on this single possible application of our fractionating condenser system does not constrain its application for other useful applications to fractionate pyrolysis vapors. Our claim to this fractionating condenser invention is based on precedence in the conception and application of this technology. The biomass feedstock may be utilized without pretreatment or may be treated by any means to increase anhydrosugars content. Preferably, the biomass feedstock is pretreated by hot deionized water or by mild acid treatment as is often applied to increase anhydrosugars yields in bio-oil. By our method continuous sonication, microwave excitation or high-shear mixing may be employed to the biomass/mild acid mixture to more than double the reaction speed and reduce the amount of acid required for the reaction by up to 50%.

During the pyrolysis reaction liquid spray or a gas is injected, in any percentage volume of the resulting bio-oil, into the pyrolysis vapor stream as it exits the pyrolysis reactor and just prior to the vapor stream entry into the condenser train. The liquid spray may be comprised of any chemical compound(s) or mixture and the gas may be of any type or mixture of types. Our preferred liquid spray is water, either distilled or non-distilled, but any liquid that performs the function of reducing decomposition of anhydrosugars during bio-oil condensation may be utilized. A gas may be injected alone, or in combination with the liquid spray, to quench the pyrolysis vapor stream. The preferred embodiment is to inject cold nitrogen gas to cool the vapor stream. However, both the injected liquid and gas may be at any temperature.

The rapid quenching of the vapor resulting from injection into it of any type of liquid spray or gas appears to reduce the tendency of the anhydrosugars to thermally decompose and/or react with other chemical components of the pyrolysis vapor and condensing bio-oil. This interference with the decomposition and/or reaction of the anhydrosugars with both pyrolysis vapors and liquid bio-oil prior to, and during the condensation process, preserves them in higher volume than would otherwise occur. Catalysts may be utilized, either as a component of, or carried by, the quenching liquid or gas to assist in retarding the decomposition of anhydrosugars contained in the vapors.

A preferred embodiment of this invention is to use the fractionating capability of the condenser system to cause a large portion of the water content of the pyrolysis vapors to be deposited into a limited number of condensers of a condenser train; or the large proportion of pyrolysis vapor water may be condensed into a single condenser. The pyrolyzed feedstock from which this high water content fraction is produced may be non-pretreated biomass or pretreated biomass. The bio-oil may be produced from condensation of pyrolysis vapor without liquid or gas quenching, or pyrolysis vapor with liquid or gas quenching, or any combination of these treatments. In one embodiment of the invention, Condenser 1, the first of four condensers, is maintained at a temperature such that the pyrolysis vapor leaving the pyrolyzing portion of any pyrolysis reactor at 300 to 550° C. is reduced to a temperature of approximately 110-120° C. upon leaving this condenser and enters Condenser 2 at this temperature. Water condensation is not favored at temperatures maintained above 100° C. so that reduced water percentage is condensed in Condenser 1. Condenser 2 is maintained at a temperature such that the temperature its exiting uncondensed pyrolysis vapors are reduced to approximately 30° C. or lower as they exit Condenser 2. Maintaining Condenser 2 at a subfreezing temperature results in the fractional distillation of most of the water remaining in the uncondensed pyrolysis vapors. Also tending to condense with the water contained in the pyrolysis vapors are water soluble chemicals such as carboxylic acids, anhydrosugar derivatives with some trace of the lighter-weight lignins and phenols. Condensers 3 and 4 can be maintained at room temperature or chilled to encourage increased condensation of the remaining condensable pyrolysis vapors. For the room temperature condensers following Condenser 2 the heavier pyroligneous compounds and some remaining water components that condense in the condensers beyond Condenser 2 do so due to a combination of increased availability of condenser surface area over a longer time period at room temperature, or lower Another preferred embodiment of our invention is to increase the internal surface area of Condenser 2 such that increased condensation of the water component of the pyrolysis vapor is condensed to the maximum degree possible. This will result in a higher amount of the bio-oil aqueous fraction being condensed in Condenser 2 than is reported here for our current design which utilizes condensers of equal size for all condensers with the exception of a relatively large shell and tube applied for Condenser 4. Size of the condensers following Condenser 2, however, are largely irrelevant for condensation of the aqueous fraction as this bio-oil fraction has, for the most part, been condensed in Condenser 2 prior to reaching these later condensers.

Flow rate through any condenser train will change the required relation of condenser temperatures and size. Therefore, condensation of most of the bio-oil aqueous fraction into a single condenser may require different temperatures than described for our preferred embodiment. In addition, the relationship between temperature, condenser size and flow may cause the condensation of most of the aqueous fraction into a condenser other than Condenser 2. These differences are understood to be variations of our current invention and will be protected by the patent obtained for concentration of the bio-oil aqueous fraction in a limited number of condensers or a single condenses. For example, a condenser train may be comprised of 6 condensers in which it is convenient to condense the aqueous fraction into 2 or 3 of these condensers. Application of our novel fractionating condenser method to this situation remains a valid extension of our patent.

The resultant raw whole bio-oil produced by our fractionating condenser design and method may also be further fractionated by any method into pyroligneous (approximately 29%) and aqueous (approximately 71%) fractions. Preferably, water fractionation is applied to accomplish the fractionation of the bio-oil into pyroligneous and aqueous components but any fractionation method may be applied. This fractionation may be applied to the bio-oil condensed into a limited number or any single condenser or to the collected bio-oil from all condensers or to any subset of the total number of condensers.

Marker and Petri (2008) disclose a method by which water fractionation is applied to obtain the pyroligneous and aqueous fractions as previously described. These inventors propose production of gasoline or diesel hydrocarbons from the pyroligneous fraction by two stages: hydrotreating followed by hydrocracking. It is proposed that the aqueous fraction be reformed to hydrogen which is then input to the hydrotreating and hydrocracking process. This method does not propose water spray to increase anhydrosugars production in the aqueous fraction while reducing the production in the pyroligneous fraction. Our water spray method has the advantage of performing a spontaneous water fractionation in a single condenser (Condenser 2, for example, as set forth in our preferred embodiment) as a result of its high water content. This eliminates the amount of water fractionation performed at a later stage. In addition, the anhydrosugars concentration increase in both the condenser-produced spontaneously fractionated aqueous fraction and the water fractionated aqueous fraction will increase hydrogen production and yield from the reforming process. A second beneficial result is that application of water spray preserves the anhydrosugars from secondary and tertiary decomposition to compounds that are known to interfere with, or actually coke, hydrotreating and hydrocracking catalysts. This renders the pyroligneous fraction produced in the single high-water condenser (Condenser 2, for example, as set forth in our preferred embodiment) of our invention a less recalcitrant product for catalysis. For this reason our current invention is a non-obvious improvement on the Marker and Petri (2008) technology.

Based on our water spray or gas injection technology it is possible to fractionate a considerable proportion of the total water contained in pyrolysis vapor into a single condenser. Following spontaneous fractionation the aqueous fraction and pyroligneous fractions may be utilized to produce fuels and chemicals. It is possible to utilize the remaining whole bio-oils, contained in the condensers that did not self fractionate, without further treatment to produce fuels as well. Alternatively, the remaining whole bio-oils, contained in the non-self-fractionated condensers may also be water fractionated with their aqueous fractions combined with the aqueous fraction previously obtained from the high-water, self-fractionating condenser. The pyroligneous fractions from all of these sources may likewise be combined and utilized to produce fuels and chemicals.

Therefore, an anhydrosugar-rich aqueous fraction is produced, as described by our novel device and methods. This aqueous fraction, regardless as to how obtained by our novel device or method, may be reformed to produce hydrogen; it may be reformed to produce hydrocarbons and hydrogen; it may be hydrolyzed to sugar monomers to produce a media for fermentation by microbial means; or it may be utilized to produce any other fuel or value-added chemical or product. Likewise the pyroligneous fraction may be utilized to produce hydrocarbons or to any other fuel or value-added chemical or product.

Sonication has been shown to excite reactions in other fields off fuels and chemicals production. We have tested sonication to increase the demineralization reaction during mild acid pretreatment. A control without sonication was similarly performed utilizing 2 h of heat applied to the an acid treatment of biomass with 1% phosphoric acid. The 1% acid solution comprised 83% of the treated pine particle and acid solution. The treatment with sonication was for 30 min with 300 Watts of power at 200 Hz performed with a 17% southern pine wood slurry with 83% acid solution comprised of 0.5% phosphoric acid. No external heat was employed beyond that generated by the sonication treatment. Our results demonstrated that sonication produced nearly identical demineralization results and produced a similar amount of anhydrosugar as compared to the control. The sonication treatment, however, required less than 50% of the time required for the heating method. In addition, the 0.5% phosphoric acid treatment for the sonication method provided equivalent results to the 1% phosphoric acid applied for the heating method. This result indicates that catalyst can be reduced by 50% for the sonication method compared to the heating method.

The device and method of this invention may also be employed to allow high-moisture biomass to be pyrolyzed. All pyrolysis devices disclosed to date require that biomass with 10%, or less, of water content be pyrolyzed to maintain final bio-oil water content to below 30%. Exceeding the 30% water content level renders the raw bio-oil more difficult to upgrade. In addition, the bio-oil may self fractionate into aqueous and pyroligneous fractions if the 30% threshold is exceeded. Therefore, pyrolysis of green or wet biomass above 10% moisture content requires a means to produce a lower water content bio-oil than would otherwise be the result. We have demonstrated that the excess water resulting from pyrolysis of biomass with high moisture content can be segregated into the aqueous fraction condensers of our device. The bio-oil produced contains less than 30% water. Therefore, application of our device and method will allow green biomass, containing up to 100% moisture content to be pyrolyzed to produce a bio-oil with acceptable moisture content and that will not self fractionate.

The application of the capability of pyrolyzing high moisture biomass may be particularly helpful after liquid pretreatment with acids, bases or hot water to demineralize or to hydrolyze hemicellulose from the biomass. The cost of drying the wet biomass after such treatment may reduce the viability of this approach. Therefore, our device and method will be particularly useful in allowing the wet, or partially dried, biomass to be pyrolyzed with reduced cost for drying energy.

In summary, our device and method applies temperature manipulation of condensers to produce condensates with various properties. One embodiment allows segregation of much of the water contained in the pyrolysis vapor stream into a single or limited number of condensers. The condensed high-water bio-oil self fractionates to provide aqueous and pyroligneous fractions that can be utilized to produce various products. The remaining condensers contain low water content as a result of the preferential condensation of much of the pyrolysis vapor stream water into a limited number of condensers or into a single condenser. These remaining low water fractions may be combined with the pyroligneous fraction obtained from fractionation of the contents of the high water limited number or single condenser. Alternatively, any one or more of the contents of these low water condensers may be fractionated by water, or other, fractionation method and the separated aqueous and pyroligneous fractions combined in any combination to produce various products. The contents of the various condensers may be utilized without further processing or may be fractionated and separated or combined in any manner for any number of condensers.

High moisture biomass may be pyrolyzed with water concentrated into a limited number or a single condenser followed by self fractionation. The various methods described above for obtaining and combining various aqueous and pyroligneous fractions may be practice with the bio-oils condensed from the high moisture biomass. Ultimately, a bio-oil with acceptable water content of less than, or equal to, 30% may be produced and utilized to produce various products.

In another embodiment of our device and method a liquid or gaseous spray may be injected into the pyrolytic vapor stream produced from dried (<10%) moisture content biomass or high moisture biomass (up to 100% water content) to increase the anhydrosugars remaining in the bio-oil. These anhydrosugars may be collected as separate components of the aqueous fraction produced by differential fractionation in condenser(s) of a multiple condenser train as previously described. They may be collected as the bio-oil contents of a condenser or condensers without special manipulation of condenser temperature to obtain a high water content bio-oil in a limited number or single condenser. The said bio-oils may be combined and water fractionated or fractionated separately. Therefore, the increased anhydrosugars produced by the injection of liquid or gas into the vapor stream may be concentrated by any method but preferably by water fractionation of the produced bio-oil into an anhydrosugar-rich aqueous fraction. Sonication, shearing, application of microwave or other means may be utilized to pretreat the feedstock biomass to increase anhydrosugars production during pyrolysis. These higher-energy applications will reduce reaction time and the amount of catalyst required for demineralization of the biomass.

Figure 1:
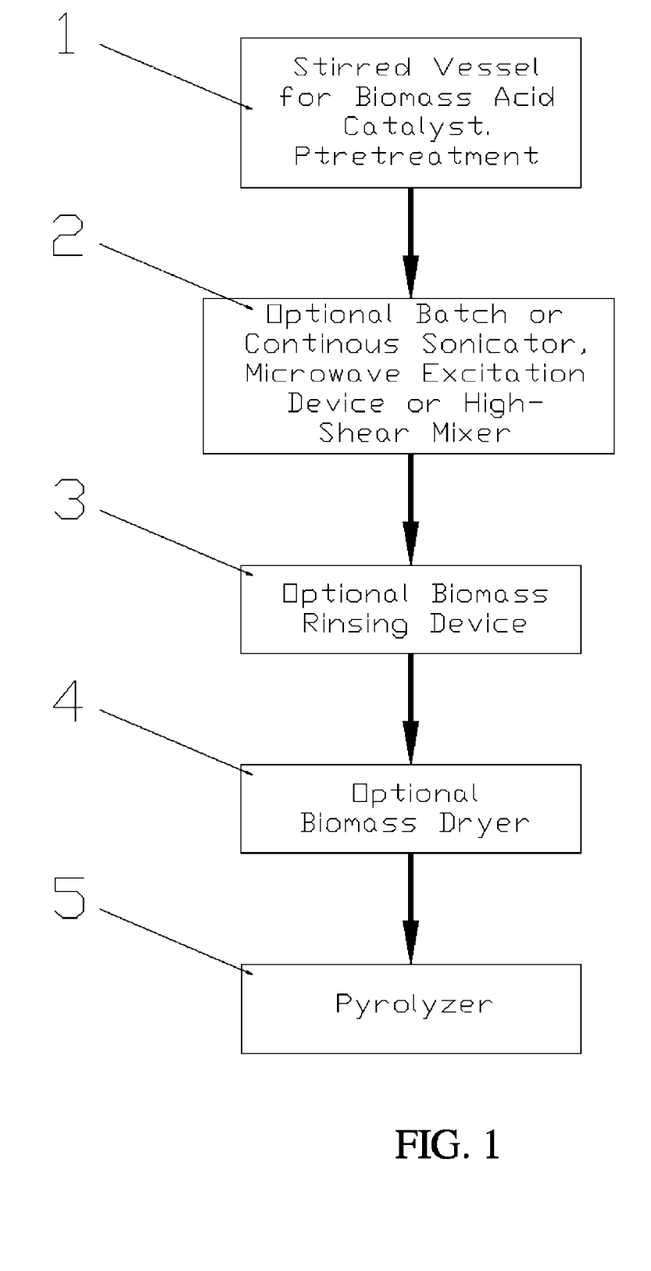
FIG. 1 illustrates an optional pretreatment methods for demineralizing or removing hemicellulose from biomass prior to pyrolysis.

The biomass pretreatment and pyrolysis diagrams given in FIGS. 1 to 4 describe the processes performed by our device. FIG. 1 illustrates alternative pretreatment processes that may, or may not, be applied to increase anhydrosugars yield in the bio-oil. Without pretreatment anhydrosugar yields may be low but separation of water, sugars and carboxylic acids of a significant portion of the aqueous phase may be beneficial to the resultant bio-oil characteristics. The beneficial influence may be on the aqueous or segregated pyroligneous fraction with reduced aqueous fraction content. Pretreatment with acids, bases, organic solvents, etc may be applied to the feedstock to increase the anhydrosugar content of the bio-oil and thereby, increase their proportion in the aqueous fraction. The treated biomass may be mixed manually to increase access of acids to the biomass molecular structure or an automatic mixer or stirrer may be employed. Alternatively, to mixing by this means an ultrasonic treatment, microwave excitation or high-shear mixing may be applied to the biomass feedstock during acid, or other chemical pretreatment, to increase the rate of pretreatment and to reduce the amount of catalyst required to accomplish the pretreatment.

As per FIG. 1 Biomass 1 is combined in any type of vessel with a catalyst and water to demineralized or to hydrolyze for hemicellulose removal. For green biomass the water addition may be optional or may be added in reduced amount to produce a slurry of suitable consistency. For dry biomass sufficient water may be added to obtain optimum results from acid pretreatment. The biomass/water/catalyst may be reacted completely at room temperature in the stirred vessel 1 at room temperature. Alternatively, the vessel 1 may be heated to any temperature that increases the reaction rate. Optionally, the slurry may be stirred briefly and subsequently input to a sonicator, microwave excitation device or high-shear mixer 2. These devices may be batch or continuous. These devices will accelerate the demineralization or hemicellulose removal process. Following pretreatment the biomass may be rinsed by a rinsing device 3 to remove residual acid in an optional step; the biomass may also be further processed without rinsing as our research has shown that removal of acid from the biomass via rinsing is not a required step to obtain pyrolytic anhydrosugars increase from acid pretreatment. The rinsed or unrinsed acid-pretreated biomass may be dried in a dryer 4 in an optional step or may be pyrolyzed as a high-moisture biomass according to the novel method of aqueous fractionation to remove excess bio-oil water as disclosed herein. The pretreated biomass is pyrolyzed in any pyrolyzer 5 with our novel fractional condenser system as described herein.

Figure 2:
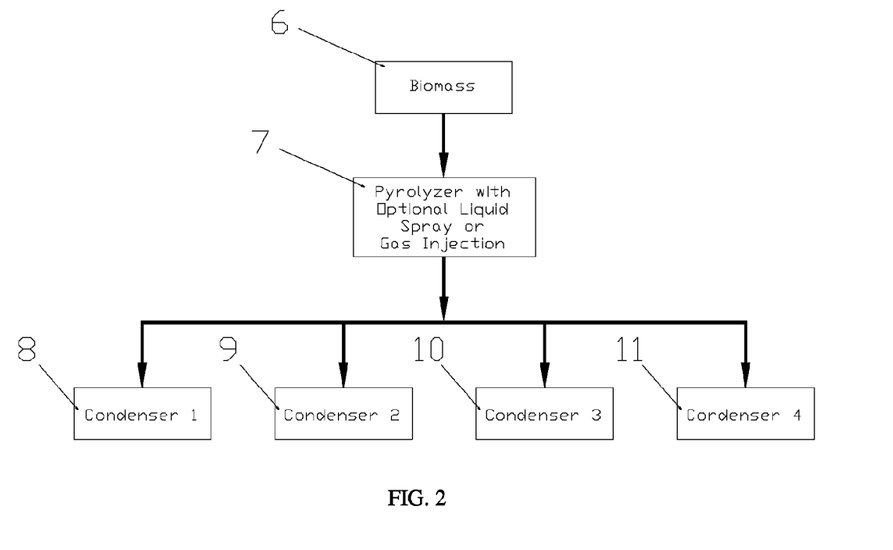
FIG. 2 illustrates of an optional fast pyrolysis and liquid spray method.

FIG. 2 illustrates the fast pyrolysis procedure in which biomass 6, pretreated or not, is input into the pyrolyzer 7. During the pyrolysis stage, regardless of pyrolyzer type, the hot pyrolysis vapor may be sprayed with a liquid spray of small droplets produced by any means. The spraying of liquid or injection of gas into the pyrolytic vapor stream is optionally performed to increase the anhydrosugars yield in the aqueous component collected in one or more condensers early in the condensation process of a multiple condenser system. Without liquid or gas injection the yield of anhydrosugars yield will be lower but remains an effective method to segregate this component. With liquid or gas injection the anhydrosugars yields will be significantly higher. The pyrolysis vapors will be condensed in Condenser 1 8, condenser 2 9, Condenser 3 10 and condenser 4 11. For both with, and without spray, a high proportion of the aqueous phase of the bio-oil vapor will be condensed into Condenser 2 4 by our preferred embodiment of temperature manipulation of the condensers. The remaining Condensers 1, 3 and 4 (8, 10, 11) will contain bio-oil with reduced water content caused by the concentration of water in Condenser 2.

Figure 3:
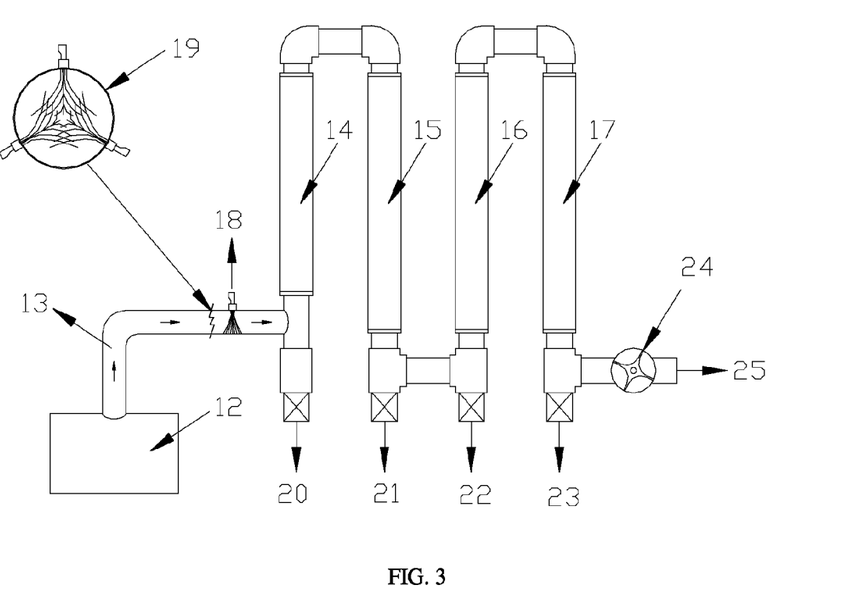
FIG. 3 depicts a schematic of the pyrolysis reactor injection device location showing the cross pipe for passage of the pyrolysis vapors to the reactor with the injection point of the cross pipe shown in its location just prior to entry of the pyrolysis vapors into the condenser train.

FIG. 3 is a schematic showing elements of a pyrolysis reactor involved in spraying water, or any other liquid or injection of any type of gas, into the pyrolysis vapor stream of any pyrolyzer type 12 with the pyrolysis reactor producing bio-oil vapors that pass through a heated pipe 13 into the condenser(s) 14, 15, 16, 17 that will rapidly condense the treated vapor stream. Just prior to entry into the condensers 14, 15, 16 and 17 a device 18 injects water or any other liquid by spraying or injects any gas into the hot pyrolytic vapor stream. A detail of our preferred embodiment applies 3 spray nozzles or gas injection ports 19 in an equidistant array around the circumference of the pipe carrying hot pyrolysis vapors. There may be any number of spray nozzles employed for this purpose. The fine spray or gas stream produced by the nozzle(s) or gas injection ports react with the pyrolysis vapors to cool the vapor stream such as to retard the thermal decomposition of anhydrosugars contained in the vapor stream. The vapors, containing increased amounts of anhydrosugars condense in one, or more condensers such that the bio-oil that can be removed at the bottom of each of condensers 14, 15, 16 and 17 by respective valves 20, 21, 22 and 23. The fractions drained from these valves 20, 21, 22 and 23 may be utilized separately or combined in various ways as described in this disclosure. An optional vacuum pressure device 24 may be utilized to induce a vacuum throughout the pyrolysis system of FIG. 3. The non-condensable gases pulled by this vacuum pressure through the system exit through the exit pipe 25 carrying the non-condensable gases from the condenser(s) 14, 15, 16 and 17.

Figure 4:
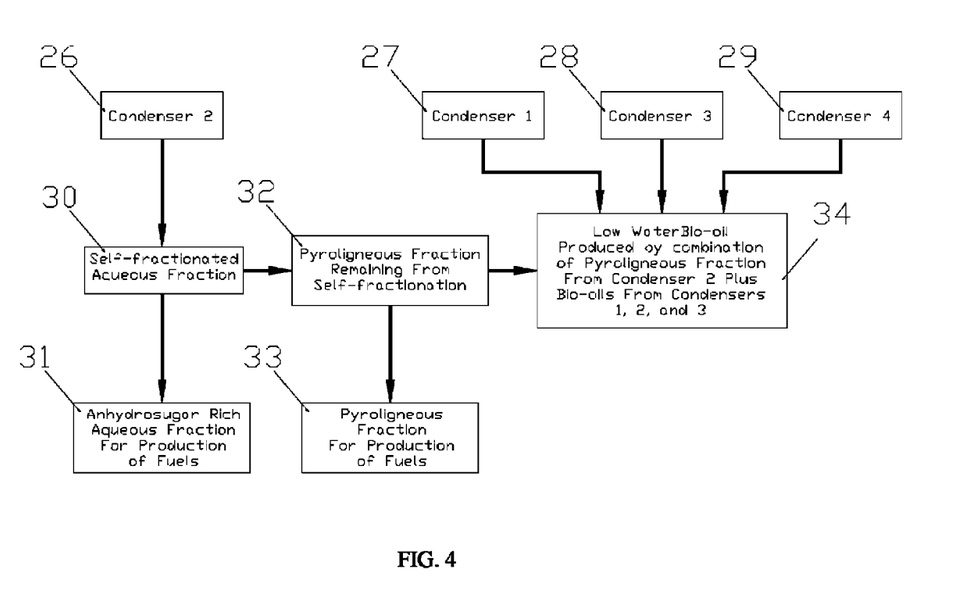
FIG. 4. Depicts a diagram showing condenser 2 bio-oil placed in a vessel and allowed to stand for self-fractionation to aqueous and pyroligneous fractions.

FIG. 4 shows one embodiment for effective utilization of our invention of a fractionating condenser train. The pyroligneous fraction is combined with the bio-oils produced in Condensers 1, 2 and 3 to provide a low-water bio-oil of high quality. The aqueous fraction containing a high percentage of anhydrosugars may be utilized for any purpose such as hydrolysis to monosugars followed by production of alcohols via microbial action. Catalytic reforming of the anhydrosugars to hydrogen or hydrocarbons may also be practiced. In this embodiment the bio-oils produced in Condensers 1 to 4 26, 27, 28 and 29 as previously described in FIGS. 1 to 4 have resulted in the condensation of a high percentage of total levoglucosan and much of the water produced during condensation being captured in Condenser 2 26. The high water content of Condenser 2 26 results in self fractionation of the bio-oil into aqueous 30, containing a high proportion of anhydrosugars 31, and a pyroligneous fraction 32. The anhydrosugars 31 contained in the aqueous fraction 30 may be utilized for production of any fuels or biochemical products. The pyroligneous product 32 may also be utilized to produce any fuels or biochemical products 33; a particular use may be to hydroprocess the pyroligneous fraction 32 to hydrocarbons.

Alternatively, the pyroligneous fraction may be combined with the low-water-content bio-oils produced in Condensers 1, 3 and 4 (24, 25, 26) to produce a combined bio-oil that, due to its low water content, is of higher utility for production of fuels and biochemicals than is bio-oil with normal water content level.

Example 1

The anhydrosugars increase and fractionation process is further illustrated by the following example:

Bio-oil vapors were produced in the MSU pyrolysis reactor by pyrolyzing biomass at 450° C. Table 1 gives the values of feedstock and water spray input to the pyrolysis reactor and the bio-oil and aqueous fraction outputs. The Table 1 values will be referenced throughout this discussion. In this example 3500 grams loblolly pine particles, dried to 1% moisture content, and of 1 to 3 mm size were pyrolyzed in the MSU auger reactor at a rate of 7 kg/h to produce approximately 3 liters per hour of bio-oil. The MSU auger reactor design employs a cross pipe from the main reactor tube to transport pyrolysis vapors to the condenser train comprised of multiple fractionating condensers. During transfer in the vapor cross pipe vapors were quenched with a spray of deionized water. In this experiment 271 g of water was sprayed into the vapor stream.

For a 450° C. pyrolysis temperature, applied in the main reactor tube for our reactor, the vapor stream temperature entering Condenser 1 is approximately 400° C. The Condenser 1 cooling shell had water flowing through it at 90° C. The exit gas cooled in Condenser 1 under the influence of its 90° C. temperature. This cooled the pyrolysis vapor to 110-120° C. by the time it exited Condenser 1. Therefore, the temperature of the 110-120° C. pyrolysis vapor entering Condenser 2 cooled during its passage. The water flowing through the cooling shells of Condenser 2 and the remainder of the condensers was maintained at 23° C. to maintain a mean Condenser 2 temperature of approximately 30° C.

Bio-oil was obtained from each of the 4 condensers comprising the MSU multiple condenser train and these were combined to provide a total product of bio-oil plus sprayed water of 2430.5 g. On a volume basis, because bio-oil has a density of approximately 1.2, the bio-oil volume was 2025.0 ml. The water sprayed into the vapor and condensed into the total bio-oil mixture comprised 11.2%. Normal bio-oil water content produced from pine particles under the conditions tested produces approximately 25% water content. Water content of the bio-oil produced by this experiment contained an expected value of 35.5%. This water content is less than the amount required to produce spontaneous phase separation and no such phase separation was observed.

Phase separation into aqueous and pyroligneous fractions was initiated by addition of 1:1 v/v water (2025 g water) to the 2430.5 g total raw bio-oil collected. The amount of water added on a weight basis, due to the high density of bio-oil compared to water was 83.3% added to 100% of the bio-oil. The bio-oil/water mixture was stirred for 24 hrs and then settled for 48 hrs at room temperature to allow maximum sugar extraction and complete phase separation. Following phase separation the bio-oil pyroligneous fraction comprised 29% of the total and the aqueous fraction 71%.

Sugars were analyzed by High Performance Liquid Chromatography, using a Bioradd Aminex HPX-89P column equipped with the guard column and RID (refractive index detector). The column and detector were operated at 80° C. and 40° C., respectively. The flow rate of the mobile phase (HPLC grade water, 0.2 μm filtered and degassed) was held constant at 0.6 ml/minute and the injection sample was 10 μL. Calibration curves were prepared using levoglucosan and glucose concentrations ranging from 0.2 mg/ml to 24.0 mg/ml.

The experimental treatments applied in this Example are given in Table 1: pine biomass untreated with acid and without spray applied, pine treated with acid without spray, pine treated with acid and with spray applied and pine untreated with acid and with spray applied. The biomass prior to pretreatment was 10% moisture content. Biomass particles were 1-3 mm in size. The biomass weights pyrolyzed and the weight of water spray applied for the spray treatments are also given in Table 1.

Biomass was acid pretreated by applying 1% concentration phosphoric acid solution in a ratio of 10 parts of acid solution to 1 part of biomass on a weight basis. Biomass was acid treated for 1 h at 100° C., then rinsed with deionized water followed by drying to 10% moisture content. Two untreated controls were also prepared utilizing the 10% moisture content untreated biomass. Feedstocks were pyrolyzed in the MSU auger reactor at a temperature of 450° C. reactor at a production rate of 7 kg/h to produce approximately 3 liters per hour of bio-oil. Example 1 explains the procedure utilized to spray water into the pyrolysis vapor stream of the reactor cross pipe.

TABLE 1

Treatments and biomass and spray volumes applied.

| Treatment no. | Biomass and pyrolysis vapor spray treatments | Biomass weight (g) | Water spray weight (g) |
|---|---|---|---|
| 1 | Biomass untreated; no spray | 2070 | 0 |
| 2 | Biomass pretreated; no spray | 1359 | 0 |
| 3 | Biomass untreated; spray | 1562.5 | 183 |
| 4 | Biomass pretreated; spray | 1567.5 | 170 |

Table 2 gives the water content (wt %) results for Condensers 1 to 4. For the condenser values in which water spray was added the water contents are, as expected slightly higher than for those treatments in which no water spray was added. For all treatments all Condenser 2 values are multiples of times higher in terms of water content compared to those for Condensers 1, 3 and 4. The water content values for the four treatments applied were 61.69, 68.94, 70.00 and 65.44% respectively for untreated biomass without spray, pretreated biomass without spray, untreated biomass with spray and pretreated biomass with spray. The mean value of the Condenser 2 water content values for these treatments is 66.5% as compared to the mean value for Condenser 1 of 11.5%, 17.8% for Condenser 3 and 13.5% for Condenser 4. These results indicate the novel application of condenser temperatures by our invention successfully condense large fractions of the sugar-rich bio-oil aqueous fraction into a single condenser which is one object of our invention.

TABLE 2

Water content values (wt %) by treatment for Condensers 1 to 4.

| Treatment applied | Water content (wt %) by treatment for Condensers 1 to 4 | | | |
|---|---|---|---|---|
| | Cond. 1 | Cond. 2 | Cond. 3 | Cond. 4 |
| Biomass untreated; no spray | 12.86 | 61.69 | 14.87 | 16.05 |
| Biomass pretreated; no spray | 16.51 | 68.94 | 18.14 | 18.22 |
| Biomass untreated; spray | 14.67 | 70.00 | 18.88 | 19.89 |
| Biomass pretreated; spray | 18.47 | 65.44 | 19.14 | 20.59 |

TABLE 3

Percentage levoglucosan content by wt % by treatment for each of Condensers 1 to 4.

| Treatment applied | Levoglucosan content by wt % | | | |
|---|---|---|---|---|
| | Cond. 1 | Cond. 2 | Cond. 3 | Cond. 4 |
| Biomass untreated; no spray | 41.72 | 42.03 | 11.77 | 4.49 |
| Biomass pretreated; no spray | 39.2 | 46.62 | 9.84 | 4.34 |
| Biomass untreated; spray | 43.46 | 41.59 | 7.91 | 7.04 |
| Biomass pretreated; spray | 34.02 | 53.68 | 8.82 | 3.47 |

Table 1 shows that the levoglucosan yields provided were much higher for Condensers 1 and 2 as compared to those for Condensers 3 and 4. The levoglucosan contents of Condenser 2, however, are accompanied by a high water content. We found that this high water content bio-oil in Condenser 2 self fractionates allowing the capture of the aqueous fraction. The pyroligneous fraction can be utilized for various purposes but by our preferred embodiment this fraction is combined with the bio-oil contents of Condensers 1, 3 and 4. Table 4 shows the results of the application of our preferred method in terms of total water content (wt %) contained in the bio-oil contents of Condensers 1, 3 and 4 combined with the self-fractionated pyroligneous fraction from Condenser 2. These values show that total water content by each treatment range between 12 and just above 15%. These low water content values will give a starting bio-oil with a water content 10 or more percentage points lower than the approximate 25% water content assumed for well-manufactured bio-oil of high quality.

Therefore the method described for our invention allows fractionating the aqueous fraction contained in Condenser 2 to obtain the levoglucosan for various purposes. This fraction is easily obtained due to the high water content values obtained in Condenser 2 regardless of treatment applied. Finally, a high-quality bio-oil with low water content that is more easily converted to fuels results from the combination of all products but the self-fractionated aqueous fraction from Condenser 2.

TABLE 4

Water content (wt %) contained in the bio-oil contents of Condensers 1, 3 and 4 combined with the self-fractionated pyroligneous fraction from Condenser 2.

| Treatment applied | Water content (wt %) pyroligneous content from Condenser 2 combined with bio-oils from Condensers 1, 3 and 4 |
|---|---|
| Biomass untreated; no spray | 12.27 |
| Biomass pretreated; no spray | 14.88 |
| Biomass untreated; spray | 13.79 |
| Biomass pretreated; spray | 15.55 |

Table 5 compares the yield increase of levoglucosan for the water spray method to that without water spray for biomass that has been pretreated as described above. The increase for Condenser 2 condensate was from the water spray treatment was 53.68 wt % compared to 46.62 wt % for the treatment without water spray. Therefore, the water spray treatment resulted in a levoglucosan yield increase of 15.1%. The increased yield from the total bio-oil production was obtained by combining the contents of Condensers 1 to 4 for both treatments. The levoglucosan yield for the no-spray treatment was 14.04 wt % while that for the spray treatment was 15.52 wt %. Therefore, the yield increase for the total bio-oil was 10.5%. These results indicate that our invention that concentrates water in Condenser 2 increases the concentration of levoglucosan in a single condenser when water spray is applied with our novel condenser temperature manipulation method. Most importantly a significant greater than 10% yield increase is realized for the total bio-oil produced by the water spray method. This increase will change the process economics of production of anhydrosugars via pyrolysis.

TABLE 7

Levoglucosan content (wt %) of combined bio-oils from Condensers 1-4 and from Condenser 2.

| Treatment No. | Levoglucosan content of combined Condensers 1-4 (wt %) | Levoglucosan content of Condenser 2 (wt %) |
|---|---|---|
| Biomass pretreated; no spray | 14.04 | 46.62 |
| Biomass pretreated; spray | 15.52 | 53.68 |

REFERENCES CITED

Bennett, N. M., S. S. Helle, and S. J. B. Duff. 2009. Extraction and hydrolysis of levoglucosan from pyrolysis oil. *Bioresources Technology* 100 (2009) 6059-6083.

Boateng, A. A. 2007. Characterization and thermal conversion of charcoal derived from fluidized-bed fast pyrolysis oil production of switchgrass. *Ind. Eng. Chem. Res.* 46:8857-8862.

Brown, R., D. Radlein, J. Piskorz. 2001. Pretreatment processes to increase pyrolytic yield of levoglucosan from herbaceous feedstocks. *ACS Symposium Series. Chemicals and Materials from Renewable Resources.* 784:123-132.

Brown, J. N. 2009. Development of a lab-scale auger reactor for biomass fast pyrolysis and process optimization using response surface methodology. Thesis, Iowa State University. Ames, Iowa, 249 p.

Diebold, J. P. and S. Czernik. 1997. Additives to lower and stabilize the viscosity of pyrolysis oils during storage. *Energy and Fuels.* 11: 1081-1091.

Dobele, G., G. Rossinskaja, T. Dizhbite, G. Telysheva, D. Meier and O. Faix. 2005. Application of catalysts for obtaining 1,6-anhydrosaccharides from cellulose and wood by fast pyrolysis. *Journal of Analytical and Applied Pyrolysis.* 74:401-405.

Ebringerova A., Z. Hromadkova. 2002. Effect of ultrasound on the extractability of corn bran hemicelluloses. *Ultrason. Sonochem.* 9(4), 225-229.

Fengel D., G. Wegener. Wood: chemistry. ultrastructure, reactions. Walter de Gruyter, Berlin. New York. 1984: 52.

Huber, G. W., J. N. Chheda, C. J. Barrett, J. A. Dumesic. 2005. Production of liquid alkanes by aqueous-phase processing of biomass-derived carbohydrates. *Science* 308:1446-1450.

Kinley, M. T., B. Krohn. 2005. Biomass conversion to alcohol using ultrasonic energy. U.S. Pat. Appl. Publ. 23 pp.

Moens, L. and S. Czernik. 2008. A method for neutralization and stabilization of biomass pyrolysis oils. Am. Chem. Soc., *Div Fuel chem. Prep. Pap.* 53(1): 347-348.

Pappas C., P. A. Tarantilis, I. Daliani, T. Mavromoustakos, M. Polissiou. 2002. Comparison of classical and ultrasound-assisted isolation procedures of cellulose from kenaf (*Hibiscus cannabinus* L.) and eucalyptus (*Eucalyptus rodustrus* Sm.). *Ultrason. Sonochem.* 9(1):19-23.

Piskorz, J., D. Radlein, D. S. Scott, and S. Czernik. 1989. Pretreatment of Wood and Cellulose for Production of Sugars by Fast Pyrolysis. *Journal of Applied Pyrolysis.* 16:127-142.

Radlein, D., J. Piskorz, A. Grinshpun and D. S. Scott. 1987. Fast pyrolysis of pretreated wood and cellulose. *American Chemical Society, Division of Fuel Chemistry.* 32:29-35.

Radlein, D. 1997. Methods of upgrading biomass pyrolysis liquids for use as fuels and as a source of chemicals by reaction with alcohols. *Fuel and Energy Abstracts.* 38(2): 79-79.

Sell, N. J., J. C. Norman, D. Jayaprakash. 1995. Deinking secondary fiber using ultrasound. *Progress in Paper Recycling.* 28-34.

Shafizadeh, F. 1980. A comprehensive pyrolytic process for conversion of wood to sugar derivatives and fuels. *American Section of the International Solar Energy Society.* 3:122-125.

Sun R. C., J. Tomkinson. 2002. Comparative study of lignins isolated by alkali and ultrasound-assisted alkali extractions from wheat straw. *Ultrason. Sonochem.* 9(2): 85-93.

Toma, M., H. Bandow, M. Vinatoru, Y. Maeda. 2006. Ultrasonically assisted conversion of lignocellulosic biomass to ethanol. AIChE Annual Meeting, Conference Proceedings, San Francisco, Calif., United States, November 12-17, 701a/1-7.

Vilkhu, K., R. Mawson, L. Simons, D. Bates. 2008. Applications and opportunities for ultrasound assisted extraction in the food industry—A review. *Innovative Food Science & Emerging Technologies.* 9(2): 161-169.

U.S. PATENT DOCUMENTS

Agblevor, F. Fractional catalytic pyrolysis of biomass. US Patent 2009/0165378.

Petri, J. A. and T. L. Marker. Production of diesel fuel from biorenewable feedstocks. U.S. Pat. No. 7,511,181 B2.

Scott, D. S., J. Piskorz, D. Radlein, P. Majerski. Process for the production of anhydrosugars from lignin and cellulose containing biomass by pyrolysis. U.S. Pat. No. 5,395,455.

The invention claimed is:

1. A method to fractionate a pyrolysis vapor stream derived from a feedstock into separate fractions comprising the step of manipulating the temperature of a plurality of condensers in a multiple condenser train,
  wherein the step of manipulating the temperature of a plurality of condensers in a multiple condenser train causes differential condensation of bio-oil vapor components in said plurality of condensers in the multiple condenser train,
  wherein the pyrolysis vapor stream has a water content,
  wherein the water content of the pyrolysis vapor stream is further condensed into a high water content bio-oil condensate in at least one condenser in the multiple condenser train, the water content in said high water content bio-oil condensate is of sufficient magnitude to cause spontaneous self-fractionation of the bio-oil contained in the high water content bio-oil condensate, and
  wherein the step of manipulating the temperature of a plurality of condensers in a multiple condenser train further comprises the steps of:
    a. manipulating the temperature of a first set of at least one condenser to be maintained at a temperature to promote the rapid cooling of pyrolysis vapors entering the at least one condenser of said first set at approximately 300 to 450° C. which decreases the temperature of vapors exiting the at least one condenser of said first set to 110 to 120° C.; and
    b. manipulating the temperature of a second set of at least one condenser to be maintained at a temperature to continue cooling of pyrolysis vapors entering the at least one condenser of said second set at 110 to 120° C. which decreases the temperature of vapors exiting the at least one condenser of said second set to 30° C., wherein said second set of at least one condenser is the at least one condenser in the multiple condenser train containing the high water content bio-oil condensate.

2. The method of claim 1 wherein the feedstock is biomass or derived from biomass that was derived from an organic source.

3. The method of claim 1 wherein the separate fractions can include condensates with a high proportion of pyroligneous compounds.

4. The method of claim 1 wherein the separate fractions include condensates with a high proportion of aqueous compounds.

5. The method of claim 1 wherein the self-fractionation of the bio-oil contained in the high water content bio-oil condensate provides an anhydrosugar-rich aqueous fraction and a pyroligneous fraction.

6. The method of claim 5 wherein the anhydrosugar-rich aqueous fraction or the pyroligneous fraction can be further utilized to produce fuel, biochemical, or bio-product.

7. The method of claim 5 wherein the self-fractionated pyroligneous fraction is combined with the bio-oils with low water content to produce a combined low water content bio-oil.

8. The method of claim 5 further comprising the step of further fractionating the pyroligneous fraction, still containing water soluble chemical compounds, to produce an aqueous fraction with the resulting aqueous and pyroligneous fractions being useful for further processing.

9. The method of claim 5 further comprising the step of removing the anhydrosugar-rich aqueous fraction from the total bio-oil, wherein the pyroligneous fraction that is not condensed into the aqueous fraction condenser is improved for later production of fuels and/or chemical products.

10. The method of claim 1 wherein the condensers, other than the at least one condenser in the multiple condenser train containing the high water content bio-oil condensate, contain a bio-oil with low water content.

11. The method of claim 1 wherein subsets of the fractionated bio-oils can be further processed.

12. The method of claim 11 further comprising the steps of combining low water content bio-oil condensates and further fractionating the combined low water content bio-oil condensates by water fractionation or other method of fractionation.

13. The method of claim 12 wherein the combined low water content bio-oil condensates are processed without further fractionation.

14. The method of claim 1 wherein a green or wet biomass can be pyrolyzed with water content of bio-oil maintained below 30%, by collection and separation from the bio-oil, of excess water in the aqueous fraction in the at least one condenser in the multiple condenser train containing the high water content bio-oil condensate.

15. The method of claim 1 further comprising the step of reducing secondary and tertiary reactions to further improve the properties of the pyroligneous components of the condensed bio-oil.

16. The method of claim 1 further comprising the step of pretreating the feedstock to optimize the efficacy of a catalyst or to increase production of anhydrosugars content.

17. The method of claim 16 wherein the feedstock is any type of biomass or product derived from biomass.

18. The method of claim 16 wherein the step of pretreating increases the production of anhydrosugars content by removing hemi-cellulose from the feedstock.

19. The method of claim 16 wherein the step of pretreating is applied by ultrasound, ultrasonic agitation, sonication or microwave excitation.

20. The method of claim 16 wherein the step of pretreating is performed by mechanical methods, such as high shear stirring or mixing.

21. A method for increasing the anhydrosugar content within a pyrolysis vapor stream, derived from a feedstock, comprising injecting a liquid or gas into the pyrolysis vapor stream and manipulating the temperature of a plurality of condensers in a multiple condenser train including the steps of:
  a. manipulating the temperature of a first set of at least one condenser to be maintained at a temperature to promote the rapid cooling of pyrolysis vapors entering the at least one condenser of said first set at approximately 300 to 450° C. which decreases the temperature of vapors exiting the at least one condenser of said first set to 110 to 120° C.; and
  b. manipulating the temperature of a second set of at least one condenser to be maintained at a temperature to continue cooling of pyrolysis vapors entering the at least one condenser of said second set at 110 to 120° C. which decreases the temperature of vapors exiting the at least one condenser of said second set to 30° C., wherein said second set of at least one condenser contains a high water content bio-oil condensate.

22. The method of claim 21 wherein the feedstock is any type of biomass or product produced initially from biomass from another organic source.

23. The method of claim 21 wherein the feedstock is a biomass of high moisture content.

24. The method of claim 21 wherein the liquid injected into the pyrolysis vapor stream optimizes anhydrosugars production.

25. The method of claim 21 wherein the liquid injected into the pyrolysis vapor stream is water.

26. The method of claim 21 wherein the liquid injected into the pyrolysis vapor stream is an acidic solution.

27. The method of claim 21 wherein the liquid injected into the pyrolysis vapor stream is a basic solution.

28. The method of claim 27 wherein the liquid or gas injected into the pyrolysis vapor stream decreases secondary and tertiary decomposition reactions of the anhydrosugars in the quenched vapor.

29. The method of claim 21 wherein the liquid injected into the pyrolysis vapor stream contains a catalyst for the purpose of reducing the thermal degradation of the anhydrosugars contained in said pyrolysis vapor stream.

30. The method of claim 21 wherein the gas injected into the pyrolysis vapor stream contains a catalyst for the purpose of reducing the thermal degradation of the anhydrosugars contained in said pyrolysis vapor stream.

31. The method of claim 21 wherein the liquid is injected into the vapor stream by a mechanism that atomizes the liquid into small droplets suitable for heat transfer within the pyrolysis vapor stream.

* * * * *